US012117655B2

(12) United States Patent
Yang et al.

(10) Patent No.: US 12,117,655 B2
(45) Date of Patent: Oct. 15, 2024

(54) OPTICAL MODULE UNLOCKING APPARATUS, OPTICAL MODULE, AND OPTICAL COMMUNICATION DEVICE

(71) Applicant: HUAWEI TECHNOLOGIES CO., LTD., Shenzhen (CN)

(72) Inventors: Song Yang, Wuhan (CN); Zhigang Wang, Wuhan (CN); Liang Xu, Shenzhen (CN); Yu Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 17/850,360

(22) Filed: Jun. 27, 2022

(65) Prior Publication Data

US 2022/0357520 A1 Nov. 10, 2022

Related U.S. Application Data

(63) Continuation of application No. PCT/CN2019/130743, filed on Dec. 31, 2019.

(51) Int. Cl.
*G02B 6/38* (2006.01)
(52) U.S. Cl.
CPC ........... *G02B 6/387* (2013.01); *G02B 6/3858* (2013.01); *G02B 6/3893* (2013.01)
(58) Field of Classification Search
None
See application file for complete search history.

(56) References Cited

U.S. PATENT DOCUMENTS

| 9,983,370 | B1 | 5/2018 | Mahoney |
| 2014/0104808 | A1* | 4/2014 | Koutrokois .......... G02B 6/4261 403/326 |
| 2017/0075083 | A1 | 3/2017 | Moore et al. |

FOREIGN PATENT DOCUMENTS

| CN | 102246075 A | 11/2011 |
| CN | 202196205 U | 4/2012 |

(Continued)

OTHER PUBLICATIONS

Extended European Search Report issued in corresponding European Application No. 19958725.4, dated Nov. 22, 2022, pp. 1-9.

(Continued)

*Primary Examiner* — Jerry Rahll
(74) *Attorney, Agent, or Firm* — HAUPTMAN HAM, LLP (57) ABSTRACT

An optical module unlocking apparatus includes a housing, including a base and a mounting portion connected to one end of the base. The base has an accommodation area for installing a circuit board and an electrical component. The apparatus also includes an unlocking component, including an unlocking arm movably connected to the housing. The unlocking arm has an abutment portion for abutting against an elastomer of a cage, and the unlocking component is configured to push the unlocking arm outward relative to the housing in an insertion direction under an action of external force to separate the abutment portion from the elastomer. The apparatus further includes an elastic component on an outer side surface of the mounting portion and outside the accommodation area. A first end of the elastic component is connected to the mounting portion and a second end of the elastic component is connected to the mounting portion.

23 Claims, 8 Drawing Sheets

(56) References Cited

FOREIGN PATENT DOCUMENTS

| | | |
|---|---|---|
| CN | 204178013 U | 2/2015 |
| CN | 107907948 A | 4/2018 |
| CN | 108873188 A | 11/2018 |
| CN | 109143496 A | 1/2019 |
| CN | 109541761 A | 3/2019 |
| CN | 109683259 A | 4/2019 |
| CN | 110286450 A | 9/2019 |

OTHER PUBLICATIONS

International Search Report issued in corresponding International Application No. PCT/CN2019/130743, dated Sep. 17, 2020, pp. 1-10.

Chinese Office Action issued in corresponding Chinese Application No. 201980102269.1, dated Oct. 28, 2022, pp. 1-8.

* cited by examiner

OPTICAL MODULE UNLOCKING APPARATUS, OPTICAL MODULE, AND OPTICAL COMMUNICATION DEVICE

CROSS-REFERENCE TO RELATED DISCLOSURES

This application is a continuation of International Application No. PCT/CN2019/130743, filed on Dec. 31, 2019, the disclosure of which is hereby incorporated by reference in its entirety.

TECHNICAL FIELD

This application relates to the field of optical communication technologies, and in particular, to an optical module unlocking apparatus, an optical module, and an optical communication device.

BACKGROUND

Pluggable optical modules are mainly connected between hosts and optical cables, and can perform conversion between optical signals and electrical signals, to implement communication. With development of optical communication technologies, people have increasingly high requirements on function diversity of the optical modules.

Currently, a cage is disposed on a host for accommodation of an optical module, and an elastomer is disposed on the cage. The optical module with an unlocking mechanism is pluggably disposed in the cage. The unlocking mechanism includes a housing for installing a circuit board and a handle disposed on the housing. One connection arm is disposed on each of two sides of the housing, and the handle is connected to the two connection arms. After the optical module is inserted into the cage, the elastomer may abut against the connection arm to lock the optical module. The optical module can be unlocked by pulling the handle. In this case, the connection arm moves relative to the housing to push the elastomer, so as to unlock the optical module. In addition, a reset spring is disposed on an inner side of each connection arm close to the circuit board, so that the connection arm can be restored to an original position after the handle is released.

However, installation space of the circuit boards and components in current optical modules is small, hindering improvement in the function diversity of the optical modules.

SUMMARY

An objective of this application is to provide an optical module unlocking apparatus, an optical module, and an optical communication device, to resolve small installation space in a circuit board and a component in a current optical module.

According to a first aspect, this application discloses an optical module unlocking apparatus. The apparatus includes: a housing, including a base and a mounting portion connected to one end of the base, where the base is provided with an accommodation area for installing a circuit board and a component, and the mounting portion is provided with at least one optical port for connecting an optical cable; an unlocking component, including an unlocking arm movably connected to the housing, where the unlocking arm is provided with an abutment portion for abutting against an elastomer of a cage, and the unlocking component is configured to push the unlocking arm outwards relative to the housing in an insertion direction under an action of external force, to separate the abutment portion from the elastomer; and an elastic component, disposed on an outer side surface of the mounting portion and outside the accommodation area, where two ends of the elastic component are respectively connected to the mounting portion and the unlocking component, the elastic component can deform under the action of the external force, and the unlocking arm moves inwards relative to the housing in the insertion direction under an action of elastic force of the elastic component when the external force disappears.

Based on the foregoing technical content, the elastic component is limited in a side area on which the optical port is disposed, the area in which the optical port is located is independent of the accommodation area in which the circuit structure is installed on the base, and the elastic component does not extend to the accommodation area. This can prevent occupying installation space of a circuit structure, increase a volume of the accommodation area, increase an area of the circuit board, increase types and a quantity of components, and improve function diversity of the optical module.

In an optional implementation, the elastic component is disposed at one end of the mounting portion in a first direction, where the first direction is perpendicular to the circuit board. In this way, space at the top or the bottom of the optical port in the first direction may be properly used, to increase installation space of the elastic component. In addition, the elastic component may be close to an axial surface of the optical module, so that a stall phenomenon can be reduced.

In an optional implementation, a first connection portion is disposed on the unlocking component, a second connection portion is disposed on the mounting portion, one end of the elastic component abuts against the first connection portion, and the other end of the elastic component abuts against the second connection portion. This ensures a simple abutting structure and easy installation.

In an optional implementation, a groove with a first opening is disposed on an outer side surface of the mounting portion, the elastic component is accommodated in the groove, and one end of the groove in the insertion direction has a groove wall, where the groove wall forms a second connection portion. The first connection portion includes a baffle plate extending into the groove, and the baffle plate is disposed opposite to the groove wall. The elastic component is installed by using the groove. In this case, the elastic component does not protrude from the top surface of the mounting portion, space of the mounting portion is properly used, and a size of the optical module is not increased, so that the size of the optical module can meet a disposing requirement.

In an optional implementation, the other end of the groove in the insertion direction has a second opening in communication with the first opening. The second opening may allow the baffle plate to move forward and backward in the insertion direction in the groove, and may increase space in which the elastic component is compressed or extended.

In an optional implementation, the mounting portion includes a top wall, a bottom wall, and two oppositely disposed side walls connected between the top wall and the bottom wall. The top wall and the bottom wall are disposed opposite to each other in the first direction, and the bottom wall is connected to the base. The top wall, the bottom wall, and the side walls enclose the optical port, and the groove is disposed on the top wall. In this way, space at the top of the optical port in the first direction may be properly used, to increase installation space of the elastic component.

In an optional implementation, a notch in communication with the optical port is further disposed at an edge of the bottom wall away from the accommodation area, where the notch is configured to accommodate a pressing portion of the optical cable. This provides sufficient operation space for the pressing portion 310 and increases the installation space of the elastic component.

In an optional implementation, the unlocking component includes a connection plate connected to the unlocking arm, where the connection plate is located outside the first opening, and the baffle plate is connected to the connection plate. This can improve fastening strength of the baffle plate, and prevent the baffle plate from deforming in a process of compressing the elastic component. In addition, the baffle plate may further assist in fastening the elastic component, and prevent the elastic component from flying out of the groove after being compressed.

In an optional implementation, the baffle plate includes a bending section and an extension section. The bending section is connected between the connection plate and the extension section, and the extension section is disposed opposite to the groove wall. The bending section is an arc section. Alternatively, the bending section is disposed obliquely relative to the connection plate. This can implement smooth transition between the connection plate and the extension section, avoid stress concentration, and improve strength of the baffle plate.

In an optional implementation, an accommodation hole is formed in the connection plate, the baffle plate is connected to a wall of the accommodation hole, and an orthographic projection of the baffle plate on the connection plate is at least partially located in the accommodation hole. This structure is simple and easy to implement.

In an optional implementation, the accommodation hole includes a gap formed at an edge of the connection plate, which facilitates processing.

In an optional implementation, a proximity interface for installing the elastic component is further disposed at a position, corresponding to the first opening, of the connection plate, which facilitates installing.

In an optional implementation, the connection plate includes a body and a cover portion connected to the body, where the body is connected to the unlocking arm, and the cover portion extends in the insertion direction to cover the first opening exposed outside the body. In this way, the optical module has a compact structure. The cover portion and the body can jointly cover the first opening, preventing the elastic component 130 from flying out of the groove after being compressed.

In an optional implementation, there are a plurality of grooves, the plurality of grooves are spaced in a second direction, and each groove accommodates one elastic component. The second direction is perpendicular to the first direction and the insertion direction. A plurality of elastic components may be mutually redundant. When one of the elastic components is faulty, another elastic component may restore the unlocking component to an initial state, improving reliability of the optical module unlocking apparatus.

In an optional implementation, a partition portion is disposed in space enclosed by the top wall, the bottom wall, and the side walls, where the partition portion divides the space into a plurality of optical ports that are spaced in a direction perpendicular to the side walls. The elastic component is disposed at one end in the first direction. This can prevent occupying space of the optical port in the second direction, properly use the space in the mounting portion, and improve function diversity of the optical module.

In an optional implementation, there are two optical ports, two grooves are disposed on the top wall, and each groove is located on the top of one optical port in the first direction. The two optical ports may be symmetrically disposed relative to the axial surface of the optical module, further reducing the stall phenomenon of the unlocking component.

In an optional implementation, the side walls and the partition portion extend into the accommodation area in the first direction. The partition portion has a first protruding section protruding from the top wall in the first direction. The side walls have second protruding sections protruding from the top wall in the first direction. A first area enclosed between one second protruding section and the first protruding section is used to accommodate a transmit component. A second area enclosed between the other second protruding section and the first protruding section is used to accommodate a receive component. In this way, the transmit component and the receive component may be respectively disposed corresponding to one optical port, which facilitates signal transmission and reduces a loss.

In an optional implementation, there are two unlocking arms. The two unlocking arms re spaced in the second direction perpendicular to the first direction, so that the optical module is securely fastened to the cage.

In an optional implementation, the unlocking component further includes a handle connected to the unlocking arm, and the handle protrudes outwards from the housing in the insertion direction. This facilitates removing the optical module.

In an optional implementation, a positioning pin is further disposed on the base, a sliding slot extending in the insertion direction is disposed on the unlocking arm, the positioning pin is inserted into the sliding slot, and the sliding slot and the positioning pin can slide relative to each other in the insertion direction. The unlocking arm can move relative to the housing in the insertion direction, to push the elastomer, so as to implement unlocking.

In an optional implementation, the housing further includes a cover body on the base. The cover body and the base enclose the accommodation area. This facilitates installing the circuit structure to the accommodation area.

In an optional implementation, a heat sink may be further disposed on the base. The heat sink may be in contact with the component on the circuit board, to dissipate heat, so that the optical module can run stably.

In an optional implementation, a support portion configured to support the transmit component and the receive component may be further disposed on the base. The support portion may have a support slot that matches a side surface of the transmit component or the receive component, to improve stability of the transmit component and the receive component.

According to a second aspect, this application discloses an optical module, including a component, a circuit board, and an optical module unlocking apparatus. The component is installed on a circuit board, and the circuit board and the component are installed in an accommodation area of a housing. Based on the foregoing technical content, the optical module disclosed in this application can increase an area of the circuit board, increase types and a quantity of components, and improve function diversity of the optical module.

According to a third aspect, this application discloses an optical communication device, including a cage and an optical module. An elastomer is disposed on the cage, the optical module is inserted into the cage, and the elastomer presses against an abutment portion of the optical module. Based on the foregoing technical content, the optical communication device disclosed in this application can increase an area of the circuit board, increase types and a quantity of components, and improve function diversity of the optical communication device.

With reference to the foregoing technical content, in the optical module unlocking apparatus, the optical module, and the optical communication device provided in this application, the elastic component is limited in a side area on which the optical port is disposed, the area in which the optical port is located is independent of the accommodation area in which the circuit structure is installed on the base, and the elastic component does not extend to the accommodation area. This can prevent occupying installation space of a circuit structure, increase a volume of the accommodation area, increase an area of the circuit board, increase types and a quantity of components, and improve function diversity of the optical module.

DESCRIPTION OF REFERENCE NUMERALS

100: Optical module; 110: Housing;
111: Base; 1111: Positioning pin;
112: Mounting portion; 1121: Top wall;
1122: Bottom wall; 1123: Side wall;
1124: Notch; 1125: Partition portion;
1126: First protruding section; 1127: Second protruding section;
1128: First area; 1129: Second area;
113: Groove; 1131: Groove wall;
114: Optical port; 115: Cover body;
116: Heat sink; 120: Unlocking component;
121: Unlocking arm; 1211: Sliding slot;
122: Abutment portion; 123: Baffle plate;
1231: Bending section; 1232: Extension section;
124: Connection plate; 1241: Accommodation hole;
1242: Proximity interface; 1243: Body;
1244: Cover portion; 125: Handle;
130: Elastic component; 140: Circuit board;
150: Component; 151: Transmit component;
152: Receive component; 160: Shielding portion;
200: Cage; 210: Elastomer;
300: Optical cable; 310: Pressing portion.

DESCRIPTION OF EMBODIMENTS

The following describes example implementations of this application in detail with reference to the accompanying drawings. It should be understood that the example implementations described herein are merely used to explain this application but are not intended to limit the following example implementations.

Figure 1:
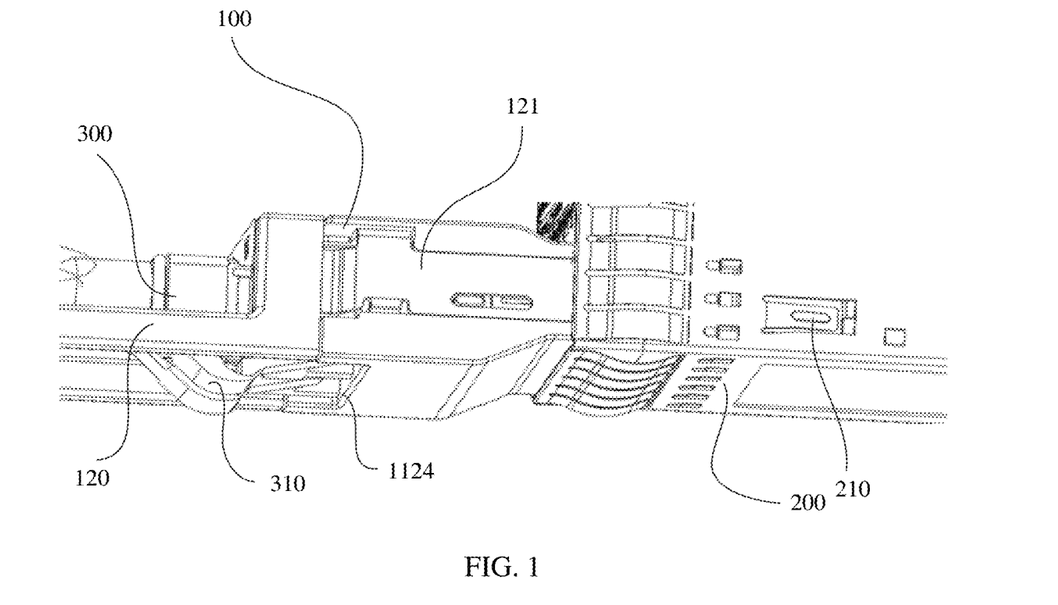
FIG. 1 is a schematic diagram of a structure of an optical communication device according to an embodiment of this application.

FIG. 1 is a schematic diagram of a structure of an optical communication device according to an embodiment of this application. This embodiment provides an optical communication device, which may include a cage 200 and an optical module 100. The optical module 100 is inserted into the cage 200.

There may be a plurality of types of optical communication devices, such as an optical transceiver, an optical fiber transceiver, a switch, an optical network adapter, an optical fiber high-speed dome camera, a base station, and a repeater. There may be a plurality of cages 200 in the optical communication device. The optical module 100 may be inserted into each cage 200. The optical module 100 may be used in the optical communication device. One end of the optical module 100 in an insertion direction can be inserted into the cage 200 of the optical communication device, and the other end of the optical module 100 may connect to an optical cable 300, to perform mutual conversion between an optical signal and an electrical signal. The optical module 100 may be encapsulated in a plurality of modes, for example, a quad small form-factor pluggable (QSFP), a quad small form-factor pluggable double density (QSFP-DD), a 10 gigabit small form-factor pluggable (XFP), and a small form-factor pluggable (SFP).

The insertion direction may be a direction of inserting or removing the optical module 100, for example, a left-right direction in FIG. 1. For ease of distinguishing, a direction (from left to right in FIG. 1) of inserting the optical module 100 is defined as a direction facing inward in the insertion direction, and a direction (from right to left in FIG. 1) of removing the optical module is defined as a direction facing outward in the insertion direction.

The optical module 100 may include an optical module unlocking apparatus and a circuit structure installed in the optical module unlocking apparatus. The optical module 100 may be inserted into, removed from, and fastened to the cage 200 by using the optical module unlocking apparatus. The optical module unlocking apparatus may include a housing 110 and an unlocking component 120. The circuit structure may be installed in the housing 110.

Figure 2:
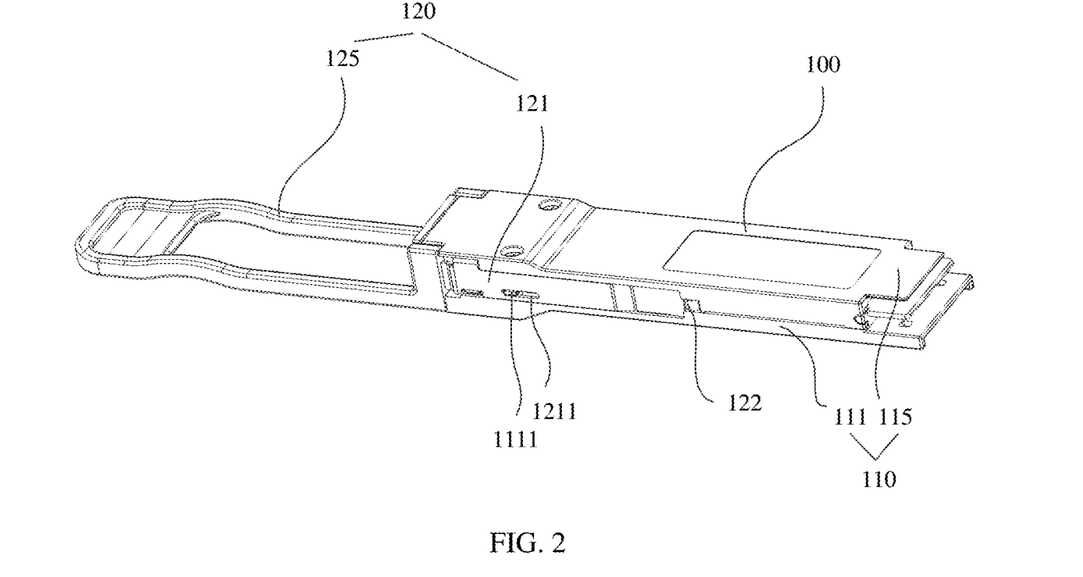
FIG. 2 is a schematic diagram of a structure of an optical module according to an embodiment of this application.
Figure 3:
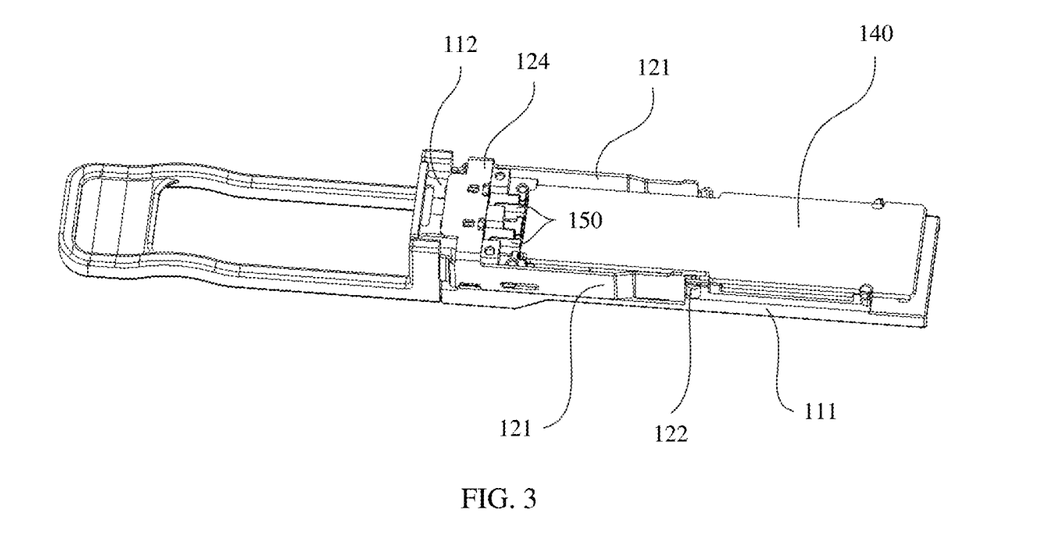
FIG. 3 is a schematic diagram of the structure in FIG. 2 with a cover plate removed.
Figure 5:
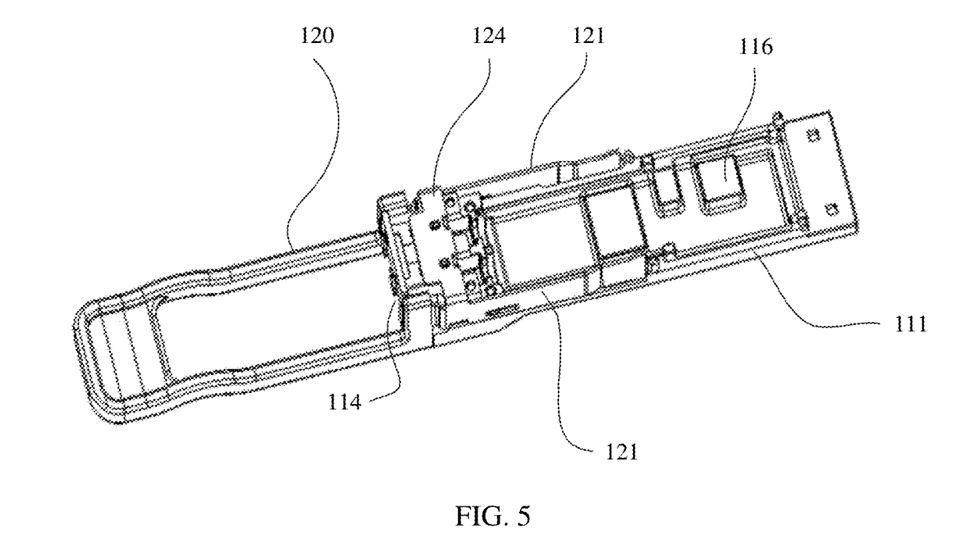
FIG. 5 is a schematic diagram of the structure in FIG. 3 with a circuit board and a component removed.

FIG. 2 is a schematic diagram of a structure of an optical module according to an embodiment of this application. FIG. 3 is a schematic diagram of the structure in FIG. 2 with a cover plate removed. FIG. 5 is a schematic diagram of the structure in FIG. 3 with a circuit board and a component removed. As shown in FIG. 2, FIG. 3, and FIG. 5, the housing 110 may include a base 111 and a mounting portion 112 connected to one end of the base 111. An accommodation area is provided in the base 111 for installing the circuit structure. The mounting portion 112 is provided with at least one optical port 114 for connecting an optical cable 300.

The base 111 may be of a plate structure, top space of the base 111 may have an accommodation area, and the circuit structure may be installed in the accommodation area. Alternatively, the base 111 may be a hollow shell structure, space enclosed by the base 111 may form an accommodation area, and the circuit structure may be installed in the accommodation area. The circuit structure may be a main electronic component for implementing optical-to-electrical conversion in the optical module 100. The circuit structure may include a circuit board 140 and a component 150 connected to the circuit board 140. The component 150 may include a plurality of electronic components. This is not limited herein. Both the circuit board 140 and the component 150 are installed in the accommodation area.

In an optional implementation, the housing 110 further includes a cover body 115 on the base 111, and the cover body 115 and the base 111 encloses the accommodation area. For example, the base 111 may be connected to the cover body 115 through screw connection or clamping. This facilitates installing the circuit structure to the accommodation area.

Optionally, as shown in FIG. 5, a heat sink 116 may be further disposed on the base 111. The heat sink 116 may be in contact with the component on the circuit board 140, to dissipate heat, so that the optical module 100 can run stably.

The mounting portion 112 may be disposed at an outer end of the base 111 in an insertion direction. Optionally, the mounting portion 112 may be integrally formed with the base 111. At least one optical port 114 may be disposed inside the mounting portion 112. The optical port 114 may extend in the insertion direction. An end of the optical cable 300 may have a connector, and the connector may be inserted into the optical port 114.

Optionally, as shown in FIG. 1, a pressing portion 310 may be disposed on a connector of the optical cable 300, and a fastener clamped with the optical port 114 may be further disposed on the connector. When the optical cable is inserted into the optical port 114, the pressing portion 310 may be pressed to retract the fastener, so that the connector can be smoothly inserted into the optical port 114. Then, the pressing portion 310 is released, and the fastener may be clamped onto the optical port 114, so that the connector and the optical module 100 securely connected. This can prevents the optical cable 300 from shaking relative to the optical module 100, which may affect signal transmission.

To provide sufficient operation space for the pressing portion 310, a notch 1124 may be further disposed on the mounting portion 112. The notch 1124 may be in communication with the optical port 114 and may be configured to accommodate the pressing portion 310 of the optical cable 300.

In this embodiment, an unlocking component 120 includes an unlocking arm 121 movably connected to the housing 110. The unlocking arm 121 may extend in the insertion direction, and may be disposed at one end of the housing 110 in a second direction. The second direction may be parallel to a direction of the circuit board, and perpendicular to the insertion direction.

Certainly, in some embodiments, there may also be a plurality of unlocking arms 121. For example, as shown in FIG. 3, two unlocking arms 121 may be disposed on the optical module 100, and the two unlocking arms 121 are respectively located at two ends of the housing in the second direction, so that the optical module 100 and the cage 200 are securely fastened.

The unlocking arm 121 can move relative to the housing 110 in the insertion direction. There may be a plurality of configuration modes. For example, a positioning pin 1111 is further disposed on the base 111, the unlocking arm 121 may extend in the insertion direction, and a sliding slot 1211 that extends in the insertion direction is disposed on the unlocking arm 121, the positioning pin 1111 is inserted into the sliding slot 1211, and the sliding slot 1211 and the positioning pin 1111 can slide relative to each other in the insertion direction. Alternatively, the sliding slot 1211 may be disposed on the base 111, and the positioning pin 1111 is disposed on the unlocking arm 121. Alternatively, the positioning pin 1111 or the sliding slot 1211 may be disposed on the mounting portion 112, and the sliding slot 1211 or the positioning pin 1111 may correspondingly be disposed on the unlocking arm 121.

An abutment portion 122 that abuts against an elastomer 210 of a cage 200 may be disposed on the unlocking arm 121. A protrusion may be disposed at one end of the unlocking arm 121. A recessed abutment portion 122 may be formed between the protrusion and the unlocking arm. A bump on the elastomer may be clamped onto a dent to fasten the optical module 100 and the cage 200.

When the optical module 100 is inserted, the optical module 100 may be pushed into the cage 200. In this case, the elastomer 210 may abut against the abutment portion 122 to implement fastening. When the optical module 100 is to be pulled out, the elastomer may pull the unlocking component 120. The unlocking component 120 may push the unlocking arm 121 outwards relative to the housing 110 in the insertion direction under an action of external force. A protrusion on the unlocking arm 121 may push the elastomer 210, to separate the abutment portion 122 from the elastomer 210. The unlocking component 120 may be further pulled, so that the entire optical module 100 moves outward, to separate from the cage 200.

Optionally, to facilitate pulling out of the optical module 100, the unlocking component 120 further includes a handle 125 connected to the unlocking arm 121, and the handle 125 protrudes outwards from the housing 110 in the insertion direction. The handle 125 may have a plurality of shapes, for example, a ring shape or a square shape. Two ends of the handle 125 may be respectively connected to two unlocking arms 121. In this way, when the handle is pulled, pulling force may be evenly transferred to the two unlocking arms 121.

Figure 4:
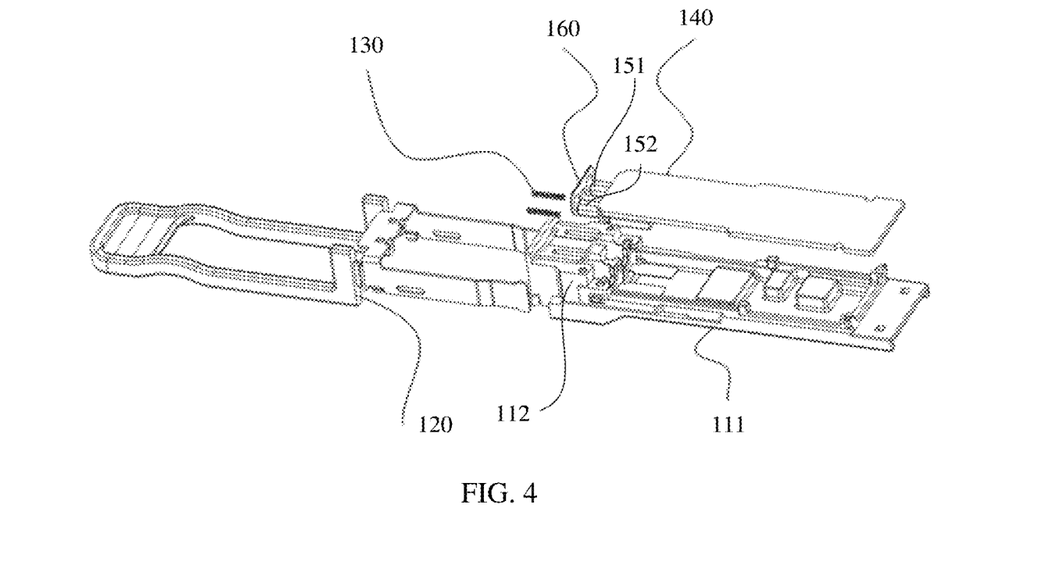
FIG. 4 is a schematic exploded view of FIG. 2.

FIG. 4 is a schematic exploded view of FIG. 2. As shown FIG. 4, during pulling out the optical module 100, the unlocking component 120 has a displacement away from the housing 110 in the insertion direction. When the pulling force disappears, to enable the unlocking component 120 to restore to an original position before being pulled, an elastic component 130 may be disposed in the optical module unlocking apparatus to restore the unlocking component 120.

The elastic component 130 may be an elastic structure such as a spiral spring, and two ends of the elastic component 130 may be respectively connected to the mounting portion and the unlocking component. The elastic component 130 can deform under an action of external force. The deformation may be tensile deformation or compressive deformation. When the external force disappears, the unlocking arm 121 moves inwards relative to the housing 110 in the insertion direction under an action of elastic force of the elastic component 130.

In addition, the elastic component 130 is disposed on an outer side surface of the mounting portion 112. The outer side surface may be an outer surface surrounding the optical port on the mounting portion 112. In addition, the elastic component 130 may be located outside the accommodation area.

It can be understood that, for an optical module in a related technology, a spring is disposed in space for installing a circuit board and a component inside a connection arm. The spring occupies installation space of the component and the circuit board, resulting in a limited area of the circuit board and a limited quantity of components, and low function diversity. In this embodiment, the elastic component 130 is limited in a side area on which the optical port 114 is disposed, the area in which the optical port 114 is located is independent of the accommodation area in which the circuit structure is installed on the base 111, and the elastic component 130 does not extend to the accommodation area. This can prevent installation space of a circuit structure from being occupied, increase a volume of the accommodation area, increase an area of the circuit board 140, increase types and a quantity of components 150, and improve function diversity of the optical module 100.

In an optional embodiment, the elastic component 130 is disposed at one end of the mounting portion 112 in the first direction. It may be understood that, when the optical module 100 is inserted into the cage, the mounting portion 112 may be located outside the cage 200. Due to limitations of a size and a specification of the cage 200, a size of the optical module 100 inserted into the cage 200 matches that of the cage 200, that is, a size between two unlocking arms 121 located at two ends of the housing 110 in the second direction is strictly limited. Therefore, stricter requirements are imposed on a size of the mounting portion 112 in the second direction, and lower requirements are imposed on a size of the mounting portion 112 in the first direction. The elastic component 130 is disposed at one end of the mounting portion 112 in the first direction. In this way, space at the top or the bottom of the optical port in the first direction may be properly used, to increase installation space of the elastic component 130.

In addition, one spring is disposed inside each connection arm in the related technology. When the handle is pulled, pulling forces of two connection arms are different due to a position on which the force is applied, and a compression length of the spring is also different. As a result, a stall phenomenon is likely to occur. In this embodiment, the elastic component 130 is disposed at one end of the mounting portion 112 in the first direction, so that the elastic component may be close to an axial surface of the optical module 100, reducing the stall phenomenon.

In an optional mode of disposing the elastic component 130, a first connection portion is disposed on the unlocking component 120, and a second connection portion is disposed on the mounting portion 112. One end of the elastic component 130 abuts against the first connection portion, and the other end of the elastic component 130 abuts against the second connection portion. The first connection portion and the second connection portion may be spaced in the insertion direction. The elastic component 130 may be a compression spring, and two ends of the elastic component 130 may respectively abut against the first connection portion and the second connection portion. The elastic component 130 is connected by abutting. This structure is simple and easy to implement.

When the unlocking component 120 moves outwards in the insertion direction under the action of external force, the first connection portion moves outwards relative to the second connection portion, and the elastic component 130 may be compressed and deformed under an action of pressure. After the optical module is pulled out, the external force disappears, and the second connection portion may also move relative to the first connection portion under an elastic action of the elastic component 130, so that the unlocking component 120 is restored to an initial state when the elastic component 130 is not compressed.

Figure 6:
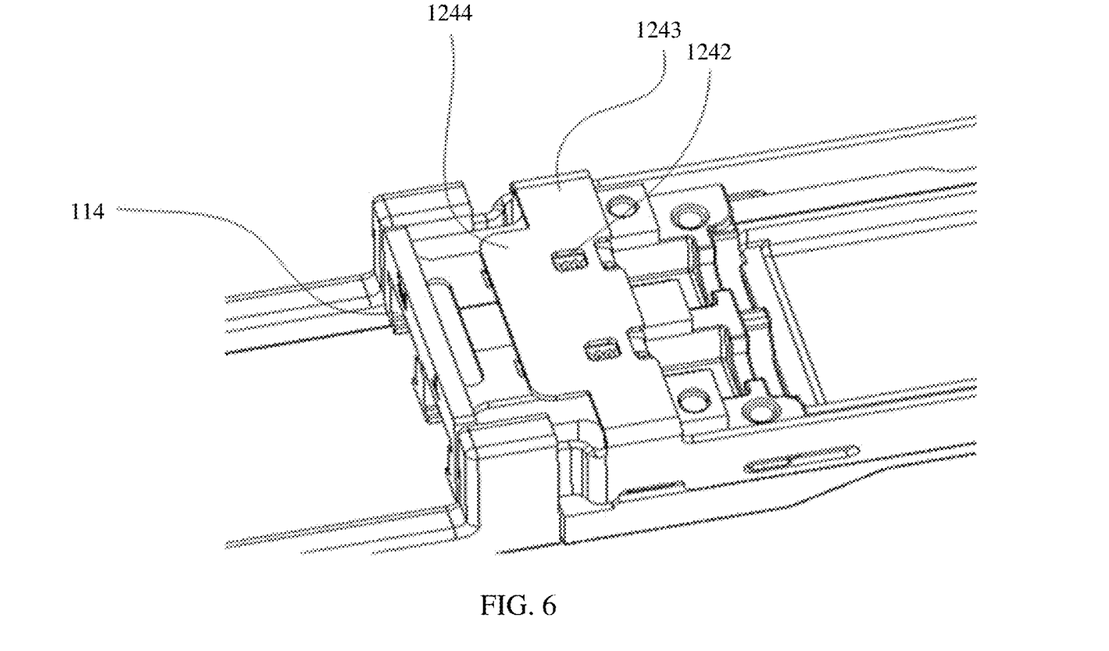
FIG. 6 is an enlarged view of a local part of FIG. 5.
Figure 7:
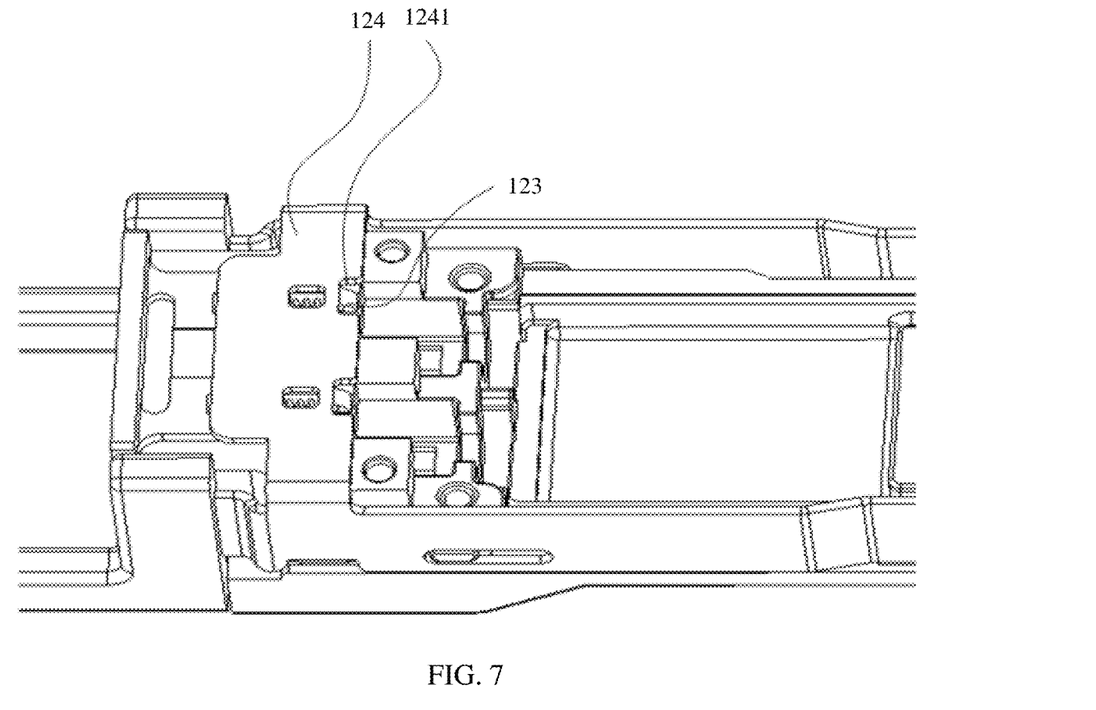
FIG. 7 is a schematic diagram of the structure in FIG. 6 at another angle.
Figure 8:
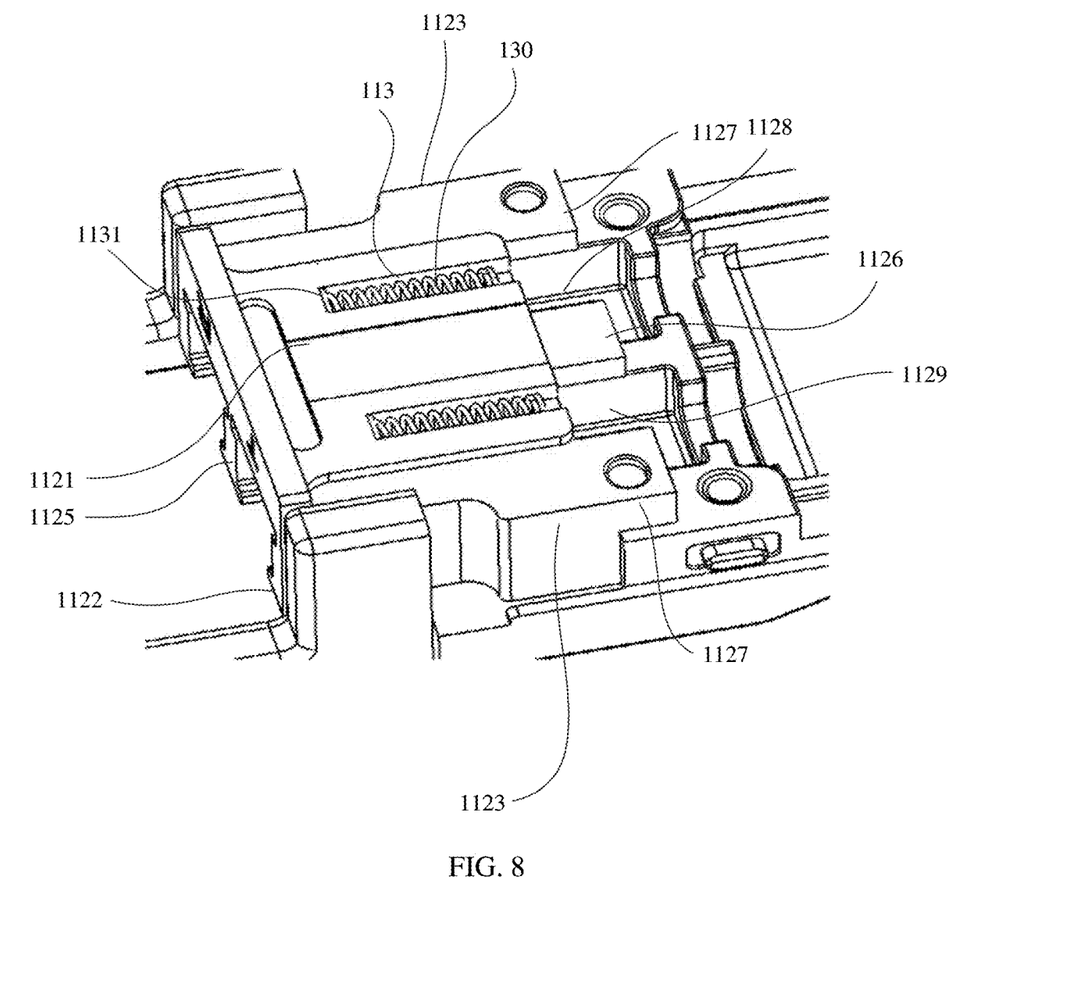
FIG. 8 is a schematic diagram of the structure in FIG. 6 with a connection plate removed.

FIG. 6 is an enlarged view of a local part of FIG. 5. FIG. 7 is a schematic diagram of the structure in FIG. 6 at another angle. FIG. 8 is a schematic diagram of the structure in FIG. 6 with a connection plate removed.

Refer to FIG. 6 to FIG. 8. Optionally, a groove 113 with a first opening is disposed on an outer side surface of a mounting portion 112. The first opening is a top opening of the groove 113 in FIG. 8. An elastic component 130 is accommodated in the groove 113, and one end of the groove 113 in an insertion direction has a groove wall 1131, where the groove wall 1131 forms a second connection portion. A first connection portion includes a baffle plate 123 extending into the groove 113, and a baffle plate 123 is disposed opposite to the groove wall 1131.

One end of the elastic component 130 abuts against the groove wall 1131, and the other end of the elastic component 130 abuts against the baffle plate 123. The elastic component 130 is installed by using the groove 113. In this case, the elastic component 130 does not protrude from the top surface of the mounting portion 112, space of the mounting portion 112 is properly used, and a size of the optical module 100 is not increased, so that the size of the optical module 100 can meet a disposing requirement.

The uncompressed natural length of the elastic component 130 may be less than the length of the groove 113 in the insertion direction, so that the elastic component 130 may be always located in the groove 113 during deformation, to prevent the spring from extending to an accommodation area to occupy installation space of a component 150 and a circuit board 140.

Still refer to FIG. 8. The other end of the groove 113 in the insertion direction has a second opening in communication with the first opening. The second opening may be an opening on the right side of the groove 113. The second opening and the groove wall 1131 may be separately disposed opposite to each other in the insertion direction. The second opening may allow the baffle plate 123 to move forward and backward in the insertion direction in the groove 113, and may increase space in which the elastic component 130 is compressed or extended.

In an optional structure of the mounting portion 112, as shown in FIG. 8, the mounting portion 112 includes a top wall 1121, a bottom wall 1122, and two oppositely disposed side walls 1123 connected between the top wall 1121 and the bottom wall 1122. The top wall 1121 and the bottom wall 1122 are disposed opposite to each other in a first direction. Two side walls 1123 may be disposed opposite to each other in a second direction. The bottom wall 1122 is connected to a base 111. The top wall 1121, the bottom wall 1122, and the side walls 1123 enclose an optical port 114, and the groove 113 is disposed on the top wall 1121. In this way, space at the top of the optical port 114 in the first direction may be properly used, to increase installation space of the elastic component 130.

The top wall 1121, the bottom wall 1122, and the side walls 1123 each may be a plate-like or block-like structure with a thickness. Their thicknesses may be the same or different, which is not limited herein. Optionally, the top wall 1121, the bottom wall 1122, and the side walls 1123 may be integrally formed.

In addition, to facilitate installation of the unlocking component 120 or another structural component, bosses or dents of various shapes may be disposed on the top wall 1121, the bottom wall 1122, and the side walls 1123, based on an actual structure.

The bottom wall 1122 may be connected to the base 111. For example, the bottom wall 1122 and the base 111 may be connected in sequence in the insertion direction. Optionally, the bottom wall 1122 and the base 111 may also be integrally formed. Two unlocking arms 121 may be respectively located outside the two side walls 1123.

In this embodiment, the groove 113 is disposed on the top wall 1121. Certainly, in another embodiment, the groove 113 may also be disposed in the bottom wall 1122.

Optionally, a notch 1124 is further disposed at an edge of the bottom wall 1122 away from the accommodation area, where the notch 1124 is configured to accommodate a pressing portion 310. Due to existence of the notch 1124, space for disposing the elastic component 130 on the bottom wall 1122 is reduced. In this case, the elastic component 130 is installed in the groove 113 of the top wall 1121, so that a mounting area of the elastic component 130 may be enlarged, facilitating disposition and installation of the elastic component.

Refer to FIG. 7 and FIG. 8. In an optional mode of disposing the baffle plate 123, the unlocking component 120 includes a connection plate 124 connected to the unlocking arms 121. The connection plate 124 may extend in the second direction, and two ends of the connection plate 124 in the second direction may be respectively connected to the two unlocking arms 121. The connection plate 124 may be located outside the first opening, that is, above the top wall 1121. The baffle plate 123 is connected to the connection plate 124. This can improve fastening strength of the baffle plate 123, and prevent the baffle plate 123 from deforming in a process of compressing the elastic component 130. In addition, the baffle plate 123 may further assist in fastening the elastic component 130, and prevent the elastic component 130 from flying out of the groove 113 after being compressed.

Figure 9:
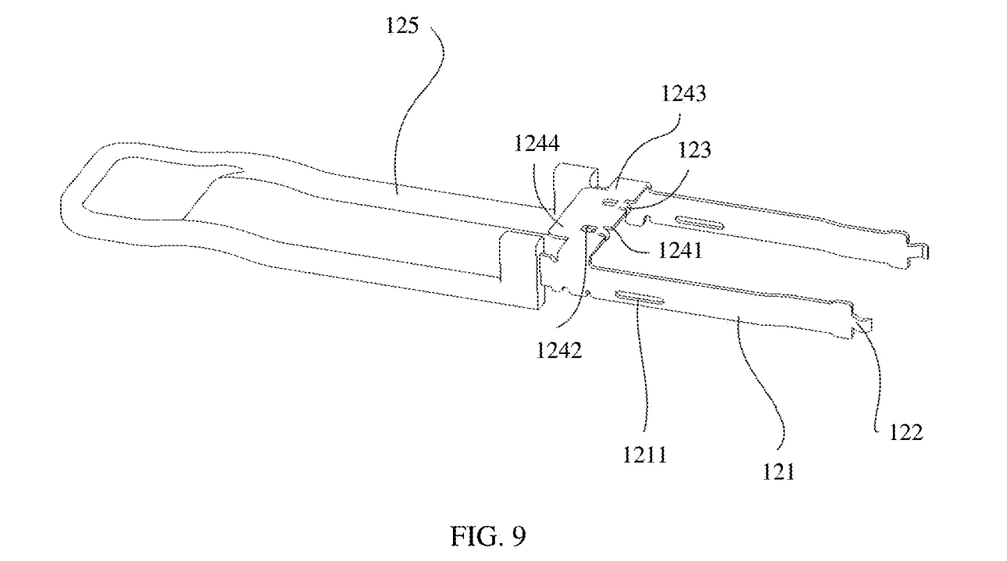
FIG. 9 is a schematic diagram of the structure of an unlocking component in FIG. 4.
Figure 10:
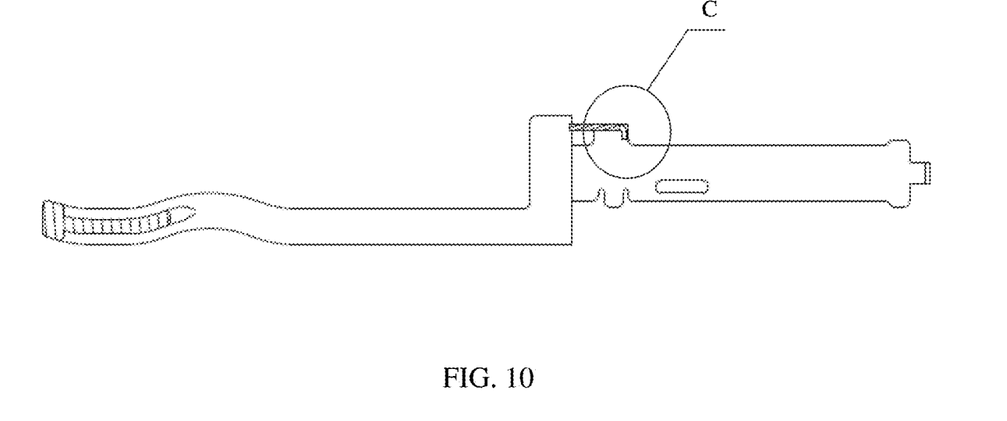
FIG. 10 is a schematic cross-sectional view of the structure in FIG. 9.
Figure 11:
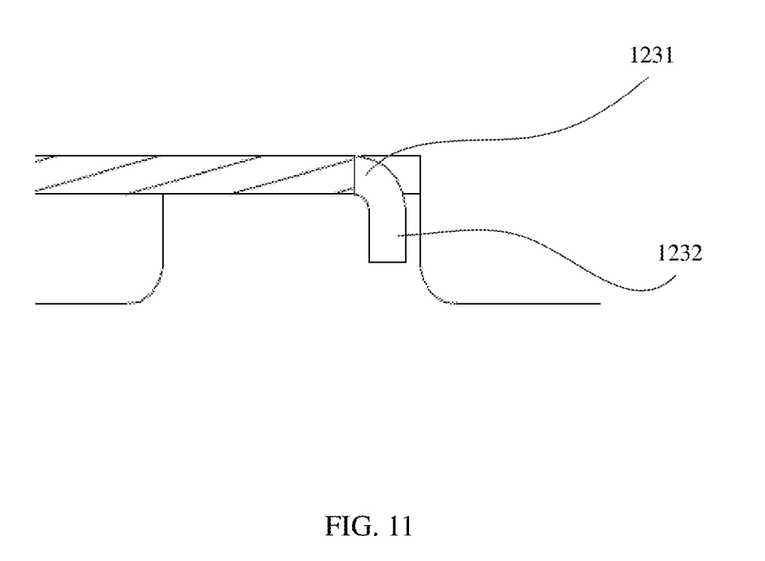
FIG. 11 is an enlarged view at C in FIG. 10.

FIG. 9 is a schematic diagram of the structure of an unlocking component in FIG. 4. FIG. 10 is a schematic cross-sectional view of the structure in FIG. 9. FIG. 11 is an enlarged view at C in FIG. 10. As shown in FIG. 9 to FIG. 11, the baffle plate 123 may include a bending section 1231 and an extension section 1232. The bending section 1231 is connected between the connection plate 124 and the extension section 1232, and the extension section 1232 is disposed opposite to each other. Two ends of the elastic component 130 may abut between the groove wall 1131 and the extension section 1232.

The baffle plate 123 may be separately installed on the connection plate 124, or may be integrally formed with the connection plate 124. For example, the bending section 1231 and the extension section 1232 may be formed through bending, to improve strength of the extension section 1232.

Optionally, the bending section 1231 is an arc section. Alternatively, the bending section 1231 is disposed obliquely relative to the connection plate 124. This can implement smooth transition between the connection plate 124 and the extension section 1232, avoid stress concentration, and improve strength of the baffle plate.

Refer to FIG. 7 and FIG. 9. An accommodation hole 1241 is formed in the connection plate 124, the baffle plate 123 is connected to a wall of the accommodation hole 1241, and an orthographic projection of the baffle plate 123 on the connection plate 124 is at least partially located in the accommodation hole 1241. When the baffle plate 123 is processed, the connection plate 124 may be cut in a position of the wall of the accommodation hole 1241. A part of the hole wall is reserved, and the connection plate 124 inside the hole wall keeps connected to a connection plate 124 in another position. For example, for a rectangular accommodation hole 1241, three sides may be cut, one side is reserved, and the connection plate 124 inside the hole wall is bent to form the baffle plate 123. This structure is simple and easy to implement.

Optionally, the accommodation hole 1241 includes a gap formed at an edge of the connection plate 124. In this case, the baffle plate 123 can be bent by cutting only two edges of the accommodation hole 1241, facilitating processing.

Refer to FIG. 6. A proximity interface 1242 for installing the elastic component 130 is further disposed at a position, corresponding to the first opening, of the connection plate 124.

An area of the proximity interface 1242 may be greater than a cross-sectional area of the elastic component 130, so that the elastic component 130 can be quickly installed into the groove 113 from the proximity interface 1242, facilitating installation.

Still refer to FIG. 6. The connection plate 124 includes a body 1243 and a cover portion 1244 connected to the body 1243. The body 1243 is connected to the unlocking arm 121. The body 1243 may extend in the second direction. Optionally, two ends of the body 1243 may be separately connected to one unlocking arm 121.

The cover portion 1244 extends in the insertion direction to cover the first opening exposed outside the body 1243. A size of the cover portion 1244 in the second direction may be less than a size of the body 1243 in the second direction.

It may be understood that the cover portion 1244 only covers the first opening, and does not participate in connection of the unlocking arm 121, so that a structure of the optical module 100 is compact. The cover portion 1244 and the body 1243 may jointly cover the first opening, preventing the elastic component 130 from flying out of the groove 113 after being compressed.

In addition, the body 1243 is connected to the unlocking arm 121, which provides high strength. Therefore, both the proximity interface 1242 and the baffle plate 123 may be disposed on the body 1243, to improve strength of the baffle plate 123.

Based on the foregoing embodiment, there may be only one groove 113, and the groove 113 may be disposed on an axial surface of the optical module 100. Certainly, there may also be a plurality of grooves 113, the plurality of grooves 113 are spaced in the second direction, and each groove 113 accommodates one elastic component 130. A plurality of elastic components 130 may be mutually redundant. When one of the elastic components 130 is faulty, another elastic component 130 may restore the unlocking component 120 to an initial state, to improve reliability of the optical module unlocking apparatus. In addition, the plurality of elastic components 130 may further increase restoration speed of the unlocking component 120.

In an optional embodiment, a partition portion 1125 is disposed in space enclosed by the top wall 1121, the bottom wall 1122, and the side walls 1123. The partition portion 1125 divides the space into a plurality of optical ports 114 that are spaced in a direction perpendicular to the side walls 1123.

In this embodiment, there may be at least one partition portion 1125, so that internal space of the mounting portion 112 is divided into a plurality of optical ports 114 spaced in the second direction. When the optical module 100 has the plurality of optical ports 114, thickness space of the side walls 1123 in the second direction is limited. Therefore, the elastic component 130 is disposed on the top wall 1121 or the bottom wall 1122 in the first direction. This can prevent occupying space of the optical port 114 in the second direction, properly use the space of the mounting portion 112, and improve function diversity of the optical module.

Refer to FIG. 6 and FIG. 8. In an embodiment, there are two optical ports 114, two grooves 113 are disposed on the top wall 1121, and each groove 1131 is located at the top of one optical port 114 in the first direction. The two optical ports 114 may be symmetrically disposed relative to the axial surface of the optical module 100, further reducing the stall phenomenon of the unlocking component 120. The axial surface may be a plane perpendicular to the second direction.

Figure 12:
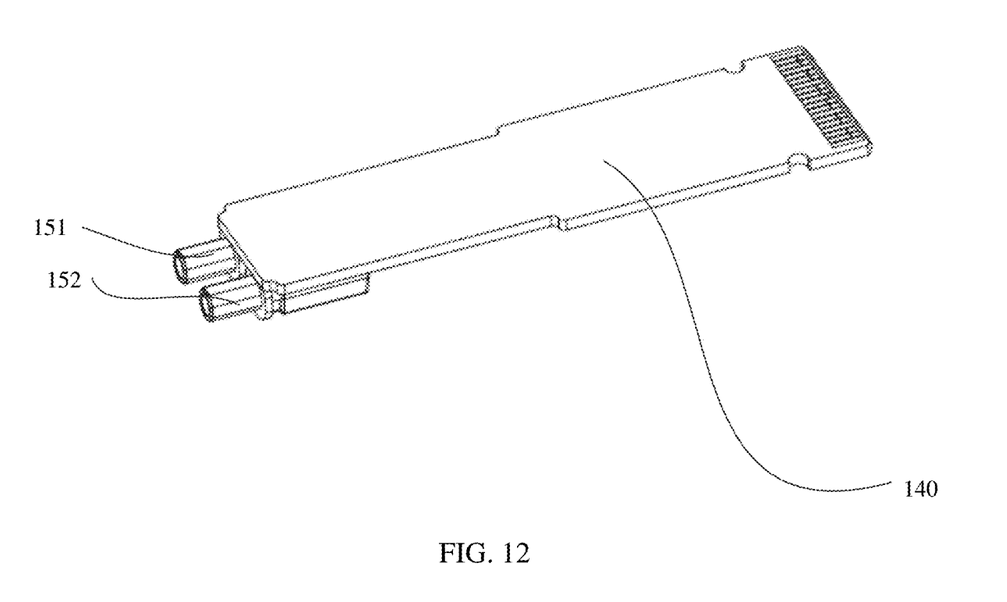
FIG. 12 is a schematic diagram of the structure of the circuit board and the component in FIG. 4.

FIG. 12 is a schematic diagram of the structure of the circuit board and the component in FIG. 4. As shown FIG. 12, it may be understood that, for an optical module 100 provided with two optical ports 114, one of the two optical ports 114 may be used for sending, and the other of the two optical ports 114 may be used for receiving. A component 150 may include at least a transmit component 151 and a receive component 152 that extend out of the circuit board 140. One optical port 114 may correspond to the transmit component 151, and the other optical port 114 may correspond to the receive component 152.

Refer to FIG. 8 and FIG. 12. The side walls 1123 and the partition portion 1125 extend into the accommodation area in the first direction. The partition portion 1125 has a first protruding section 1126 protruding from the top wall 1121 in the first direction. The side walls 1123 have second protruding sections 1127 protruding from the top wall 1121 in the first direction. A first area 1128 enclosed between one second protruding section 1127 and the first protruding section 1126 is used to accommodate a transmit component 151. A second area 1129 enclosed between the other second protruding section 1127 and the first protruding section 1126 is used to accommodate a receive component 152.

In this embodiment, the top wall 1121 and the bottom wall 1122 may not extend to the accommodation area. The side walls 1123 and the partition portion 1125 may extend to the accommodation area. A part of the side walls 1123 in the accommodation area may be second protruding sections 1127. A part of the partition portion 1125 in the accommodation area may be a first protruding section 1126. Bottoms of the first protruding section 1126 and the second protruding section 1127 may be connected to the base 111, and tops of the first protruding section 1126 and the second protruding section 1127 may be exposed outside the top wall 1121.

Two second protruding sections 1127 and one first protruding section 1126 may divide a partial accommodation area into a first area 1128 and a second area 1129. The transmit component 151 may be installed in the first area 1128, so that the transmit component 151 may be disposed corresponding to one optical port 114. The receive component 152 may be installed in the second area 1129, so that the receive component 152 may be respectively disposed corresponding to one optical port 114, which facilitates signal transmission and reduces a loss.

Figure 13:
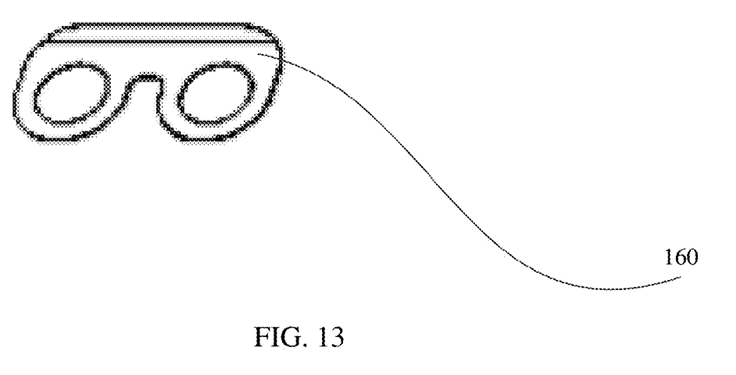
FIG. 13 is a schematic diagram of the structure of a shielding portion in FIG. 4.

FIG. 13 is a schematic diagram of the structure of a shielding portion in FIG. 4. Refer to FIG. 4 and FIG. 13. A shielding portion 160 is further disposed in the optical module 100, and the shielding portion 160 may have two holes, respectively passing through a 151 and a component 152. The shielding portion 160 may abut against an edge of a circuit board 140, to prevent signal interference.

Optionally, a support portion configured to support the transmit component 151 and the receive component 152 may be further disposed on the base 111. The support portion may have a support slot that matches a side surface of the transmit component 151 or the receive component 152, to improve stability of the transmit component 151 and the receive component 152.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of this application.

What is claimed is:

1. An optical module unlocking apparatus, comprising:
   a housing, comprising a base and a mounting portion connected to one end of the base, wherein the base has an accommodation area for installing a circuit board and an electrical component, and the mounting portion has at least one optical port for connecting an optical; cable, and a groove with a first opening on an outer side surface of the mounting portion,
   an unlocking component, comprising an unlocking arm movably connected to the housing, and a connection plate connected to the unlocking arm, wherein the unlocking arm has an abutment portion for abutting against an elastomer of a cage, the connection plate is outside the first opening, and the unlocking component is configured to push the unlocking arm outward relative to the housing in an insertion direction under an action of external force to separate the abutment portion from the elastomer; and
   an elastic component, in the groove on the outer side surface of the mounting portion and outside the accommodation area, wherein a first end of the elastic component is connected to the mounting portion, a second end of the elastic component is connected to the unlocking component, and the unlocking arm is configured to move inward relative to the housing in the insertion direction under an action of elastic force of the elastic component after an external force that is applied to the elastic component and that causes the elastic component to deform is no longer applied to the elastic component,
   wherein
   the connection plate comprises a body and a cover portion, the body is connected to the unlocking arm, the connection plate has a first width in the insertion direction extending from a trail edge of the body to a lead edge of the body in the insertion direction, the cover portion extends from the lead edge of the body in the insertion direction, the connection plate has a second width in the insertion direction extending from the trail edge of the body to a lead edge of the cover portion, the second width in the insertion direction is greater than the first width in the insertion direction, and the first width of the connection plate in the insertion direction is between the cover portion and the unlocking arm, and
   the cover portion extends in the insertion direction so as to cover the first opening exposed outside the body.

2. The optical module unlocking apparatus according to claim 1, wherein the elastic component is at one end of the mounting portion in a first direction, and the first direction is perpendicular to the circuit board.

3. The optical module unlocking apparatus according to claim 2, wherein a first connection portion is on the unlocking component, a second connection portion is on the mounting portion, the first end of the elastic component abuts the first connection portion, and the second end of the elastic component abuts the second connection portion.

4. The optical module unlocking apparatus according to claim 3, wherein a first end of the groove in the insertion direction has a groove wall, wherein the groove wall is the second connection portion, and the first connection portion comprises a baffle plate extending into the groove, and the baffle plate is opposite to the groove wall.

5. The optical module unlocking apparatus according to claim 4, wherein a second end of the groove in the insertion direction has a second opening in communication with the first opening.

6. The optical module unlocking apparatus according to claim 4, wherein the mounting portion comprises a top wall, a bottom wall, and two opposing side walls connected between the top wall and the bottom wall, the top wall and the bottom wall are opposite to each other in the first direction, and the bottom wall is connected to the base, the top wall, the bottom wall, and the side walls enclose the optical port, and the groove is on the top wall.

7. The optical module unlocking apparatus according to claim 6, wherein a notch in communication with the optical port is at an edge of the bottom wall away from the accommodation area, wherein the notch is configured to accommodate a pressing portion of the optical cable.

8. The optical module unlocking apparatus according to claim 6, wherein a partition portion is in a space enclosed by the top wall, the bottom wall, and the side walls, and the partition portion divides the space into a plurality of optical ports that are spaced in a direction perpendicular to the side walls.

9. The optical module unlocking apparatus according to claim 8, wherein the at least one optical port comprises two optical ports, the groove is one of two grooves on the top wall, and each groove is on a top of one optical port in the first direction.

10. The optical module unlocking apparatus according to claim 9, wherein the side walls and the partition portion extend into the accommodation area in the first direction, the partition portion has a first protruding section protruding from the top wall in the first direction, and the side walls have second protruding sections protruding from the top wall in the first direction, a first area enclosed between one of the second protruding sections and the first protruding section is configured to accommodate a transmit component, and a second area enclosed between the other of the second protruding sections and the first protruding section is configured to accommodate a receive component.

11. The optical module unlocking apparatus according to claim 4, wherein the baffle plate is connected to the connection plate.

12. The optical module unlocking apparatus according to claim 11, wherein the baffle plate comprises a bending section and an extension section, the bending section is between the connection plate and the extension section, and the extension section is opposite to the groove wall, and the bending section is an arc section, or the bending section is obliquely relative to the connection plate.

13. The optical module unlocking apparatus according to claim 11, wherein the connection plate has an accommodation hole, the baffle plate is connected to a wall of the accommodation hole, and an orthographic projection of the baffle plate on the connection plate is at least partially in the accommodation hole.

14. The optical module unlocking apparatus according to claim 13, wherein the accommodation hole comprises a gap at an edge of the connection plate.

15. The optical module unlocking apparatus according to claim 4, wherein a proximity interface for installing the elastic component is at a position, corresponding to the first opening of the connection plate.

16. The optical module unlocking apparatus according to claim 4, wherein the groove is one of a plurality of grooves, the plurality of grooves are spaced in a second direction, one elastic component is accommodated in each groove of the plurality of grooves, and the second direction is perpendicular to the first direction and the insertion direction.

17. The optical module unlocking apparatus according to claim 2, wherein the unlocking arm is one of two unlocking arms, and the two unlocking arms are spaced in a second direction perpendicular to the first direction.

18. The optical module unlocking apparatus according to claim 1, wherein a first end of the groove in the insertion direction has a groove wall, the connection plate has a baffle plate extending into the groove with the baffle plate being opposite to the groove wall, the baffle plate comprises a bending section and an extension section, the bending section is between the connection plate and the extension section, and the extension section is opposite to the groove wall, the bending section is an arc section, the baffle plate is a portion of the body, bent away from a side of the body configured to face the mounting portion and extending away from the body, and the bending section is free from being surrounded by the body with the bending section being exposed in a direction opposite to the insertion direction.

19. The optical module unlocking apparatus according to claim 1, wherein the unlocking component further comprises a handle connected to the unlocking arm, and the handle protrudes outward from the housing in the insertion direction.

20. The optical module unlocking apparatus according to claim 1, wherein a positioning pin is on the base, a sliding slot extending in the insertion direction is on the unlocking arm, the positioning pin is inserted into the sliding slot, and the sliding slot and the positioning pin are configured to slide relative to each other in the insertion direction.

21. The optical module unlocking apparatus according to claim 1, wherein
the housing further comprises a cover body on the base, and the cover body and the base encloses the accommodation area.

22. An optical module, comprising:
the optical module unlocking apparatus according to claim 1;
the electrical component; and
the circuit board, wherein
the electrical component is installed on the circuit board, and
the circuit board and the component are installed in the accommodation area of the housing.

23. An optical communication device, comprising a cage and the optical module according to claim 22, wherein
an elastomer is on the cage, the optical module is inserted into the cage, and the elastomer abuts an abutment portion of the optical module.

* * * * *